(12) United States Patent
Yamamoto

(10) Patent No.: US 11,391,935 B2
(45) Date of Patent: Jul. 19, 2022

(54) SAMPLE OBSERVATION DEVICE AND SAMPLE OBSERVATION METHOD

(71) Applicant: HAMAMATSU PHOTONICS K.K., Hamamatsu (JP)

(72) Inventor: Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 126 days.

(21) Appl. No.: 16/981,564

(22) PCT Filed: Jan. 30, 2019

(86) PCT No.: PCT/JP2019/003233
§ 371 (c)(1),
(2) Date: Sep. 16, 2020

(87) PCT Pub. No.: WO2019/198309
PCT Pub. Date: Oct. 17, 2019

(65) Prior Publication Data
US 2021/0018735 A1    Jan. 21, 2021

(30) Foreign Application Priority Data
Apr. 9, 2018    (JP) .............................. JP2018-074868

(51) Int. Cl.
*G02B 21/00* (2006.01)
*G01N 21/64* (2006.01)
*G02B 21/26* (2006.01)

(52) U.S. Cl.
CPC ....... *G02B 21/008* (2013.01); *G01N 21/6458* (2013.01); *G02B 21/0032* (2013.01); *G02B 21/0052* (2013.01)

(58) Field of Classification Search
None
See application file for complete search history.

(56) References Cited

U.S. PATENT DOCUMENTS

2009/0231689 A1    9/2009  Pittsyn et al.
2017/0269345 A1    9/2017  Siebenmorgen et al.
(Continued)

FOREIGN PATENT DOCUMENTS

JP    S62-180241 A    8/1987
JP    H8-161530 A    6/1996
(Continued)

OTHER PUBLICATIONS

International Preliminary Report on Patentability dated Oct. 22, 2020 for PCT/JP2019/003233.

*Primary Examiner* — Christopher Braniff
(74) *Attorney, Agent, or Firm* — Faegre Drinker Biddle & Reath LLP

(57) ABSTRACT

In a sample observation device, when the angle formed by an optical axis of an emission optical system and a normal of a scanning surface is θ1 and the angle formed by an optical axis of an imaging optical system and the normal of the scanning surface is θ2, both θ1 and θ2 are 80° or less, and θ1+θ2 is 100° or more. In an image acquisition unit, an image acquisition region $F_{n+1, m+1}$ in the (m+1)-th frame of the (n+1)-th pixel is shifted from an image acquisition region $F_{n, m}$ in the m-th frame of the n-th pixel in a scanning direction of a sample according to the scanning amount of the sample in the exposure time of one frame.

5 Claims, 10 Drawing Sheets

(56) References Cited

U.S. PATENT DOCUMENTS

2018/0088308 A1    3/2018  Liu et al.
2018/0164564 A1*   6/2018  Siebenmorgen ... G02B 21/0076

FOREIGN PATENT DOCUMENTS

| JP | 2014-202967 A | 10/2014 |
| JP | 2017-058352 A | 3/2017 |
| JP | 2017-173820 A | 9/2017 |
| JP | 2017-187532 A | 10/2017 |
| JP | 2017-223706 A | 12/2017 |
| WO | WO-2016/189013 A1 | 12/2016 |

* cited by examiner (a)

(b)

(a)

(b)

SAMPLE OBSERVATION DEVICE AND SAMPLE OBSERVATION METHOD

TECHNICAL FIELD

The present disclosure relates to a sample observation device and a sample observation method.

BACKGROUND ART

SPIM (Selective Plane Illumination Microscopy) is known as one of the methods for observing the inside of a sample having a three-dimensional structure, such as a cell. For example, in a tomographic image observation device described in Patent Literature 1, the basic principle of the SPIM is disclosed. In this device, planar light is emitted to a sample, and an image of fluorescence or scattered light generated inside the sample is formed on the image forming surface to acquire observation image data of the inside of the sample.

As another sample observation device using planar light, for example, an SPIM microscope described in Patent Literature 2 can be mentioned. In the conventional SPIM microscope, observation light from the sample is imaged by the observation optical system that emits planar light having a predetermined inclination angle to the sample arrangement surface and has an observation axis perpendicular to the emission surface of the planar light.

CITATION LIST

Patent Literature

Patent Literature 1: Japanese Unexamined Patent Publication No. S62-180241
Patent Literature 2: Japanese Unexamined Patent Publication No. 2014-202967

SUMMARY OF INVENTION

Technical Problem

However, as in the above-described Patent Literature 2, in a configuration in which an emission optical system and an observation optical system are inclined with respect to the sample arrangement surface and the emission optical system and the observation optical system are maintained to be perpendicular to each other, there has been a problem that it is difficult to convert obtained image data into three-dimensional data in a real space in constructing observation image data.

The present disclosure has been made to solve the aforementioned problem, and it is an object of the present disclosure to provide a sample observation device and a sample observation method capable of easily converting obtained image data into three-dimensional data in a real space.

Solution to Problem

A sample observation device according to an aspect of the present disclosure includes: an emission optical system that emits planar light to a sample; a scanning unit that scans the sample in one direction within a scanning surface so as to pass through an emission surface of the planar light; an imaging optical system that forms an image of observation light generated in the sample by emission of the planar light; an image acquisition unit that has a plurality of pixels arranged in a two-dimensional manner and acquires a plurality of pieces of image data corresponding to an optical image of the observation light formed by the imaging optical system; and an image generation unit that generates observation image data of the sample based on the plurality of pieces of image data acquired by the image acquisition unit. When an angle formed by an optical axis of the emission optical system and a normal of the scanning surface is $\theta 1$ and an angle formed by an optical axis of the imaging optical system and the normal of the scanning surface is $\theta 2$, both $\theta 1$ and $\theta 2$ are 80° or less and a sum of $\theta 1$ and $\theta 2$ is 100° or more. In the image acquisition unit, an image acquisition region of an (n+1)-th pixel is shifted from an image acquisition region of an n-th pixel in a scanning direction of the sample according to a scanning amount of the sample in an exposure time of one frame.

In this sample observation device, the optical axis of the imaging optical system is inclined with respect to the scanning surface of the sample. Therefore, since the image acquisition unit can sequentially acquire the image data of the tomographic plane in the optical axis direction of the planar light, it is possible to acquire the image data with high throughput. In addition, in the image acquisition unit, image acquisition regions in adjacent pixels are shifted from each other according to the scanning amount of the sample in the exposure time of one frame. Therefore, since the positional relationship between the pieces of image data can be easily corrected, each piece of image data can be easily converted into three-dimensional data in the real space when constructing the observation image data.

In the sample observation device, both $\theta 1$ and $\theta 2$ may be 70° or less, and the sum of $\theta 1$ and $\theta 2$ may be 110° or more. In this range, the influence of defocus can be reduced more preferably.

The sample observation device may further include a sample container having, as the scanning surface, a surface serving as an input surface of the planar light and an output surface of the observation light. By using such a sample container, it is possible to stably scan a plurality of samples.

The sample observation device may further include an analysis unit that analyzes the observation image data and generates an analysis result. In this case, since the observation image data generated by the image generation unit is analyzed by the analysis unit, the analysis throughput can also be improved.

In addition, a sample observation method according to an aspect of the present disclosure includes: an emission step for emitting planar light to a sample using an emission optical system; a scanning step for scanning the sample in one direction within a scanning surface so as to pass through an emission surface of the planar light; an image forming step for forming an image of observation light, which is generated in the sample by emission of the planar light, using an imaging optical system; an image acquisition step for acquiring a plurality of pieces of image data corresponding to an optical image of the observation light formed in the image forming step using an image sensor having a plurality of pixels arranged in a two-dimensional manner; and an image generation step for generating observation image data of the sample based on the plurality of pieces of image data. When an angle formed by an optical axis of the emission optical system and a normal of the scanning surface is $\theta 1$ and an angle formed by an optical axis of the imaging optical system and the normal of the scanning surface is $\theta 2$, both $\theta 1$ and $\theta 2$ are 80° or less and a sum of $\theta 1$ and $\theta 2$ is 100° or more. In the image acquisition step, an image acquisition region of an (n+1)-th pixel is shifted from an image acquisition region of an n-th pixel in a scanning direction of the sample according to a scanning amount of the sample in an exposure time of one frame.

In this sample observation method, the optical axis of the imaging optical system is inclined with respect to the scanning surface of the sample. Therefore, in the image acquisition step, the image data of the tomographic plane in the optical axis direction of the planar light can be sequentially acquired, so that it is possible to acquire the image data with high throughput. In addition, in the image acquisition step, image acquisition regions in adjacent pixels are shifted from each other according to the scanning amount of the sample in the exposure time of one frame. Therefore, since the positional relationship between the pieces of image data can be easily corrected, each piece of image data can be easily converted into three-dimensional data in the real space when constructing the observation image data.

Advantageous Effects of Invention

According to the sample observation device and the sample observation method, the obtained image data can be easily converted into three-dimensional data in the real space.

DESCRIPTION OF EMBODIMENTS

Hereinafter, preferred embodiments of a sample observation device according to an aspect of the present disclosure will be described in detail with reference to the diagrams.

Figure 1:
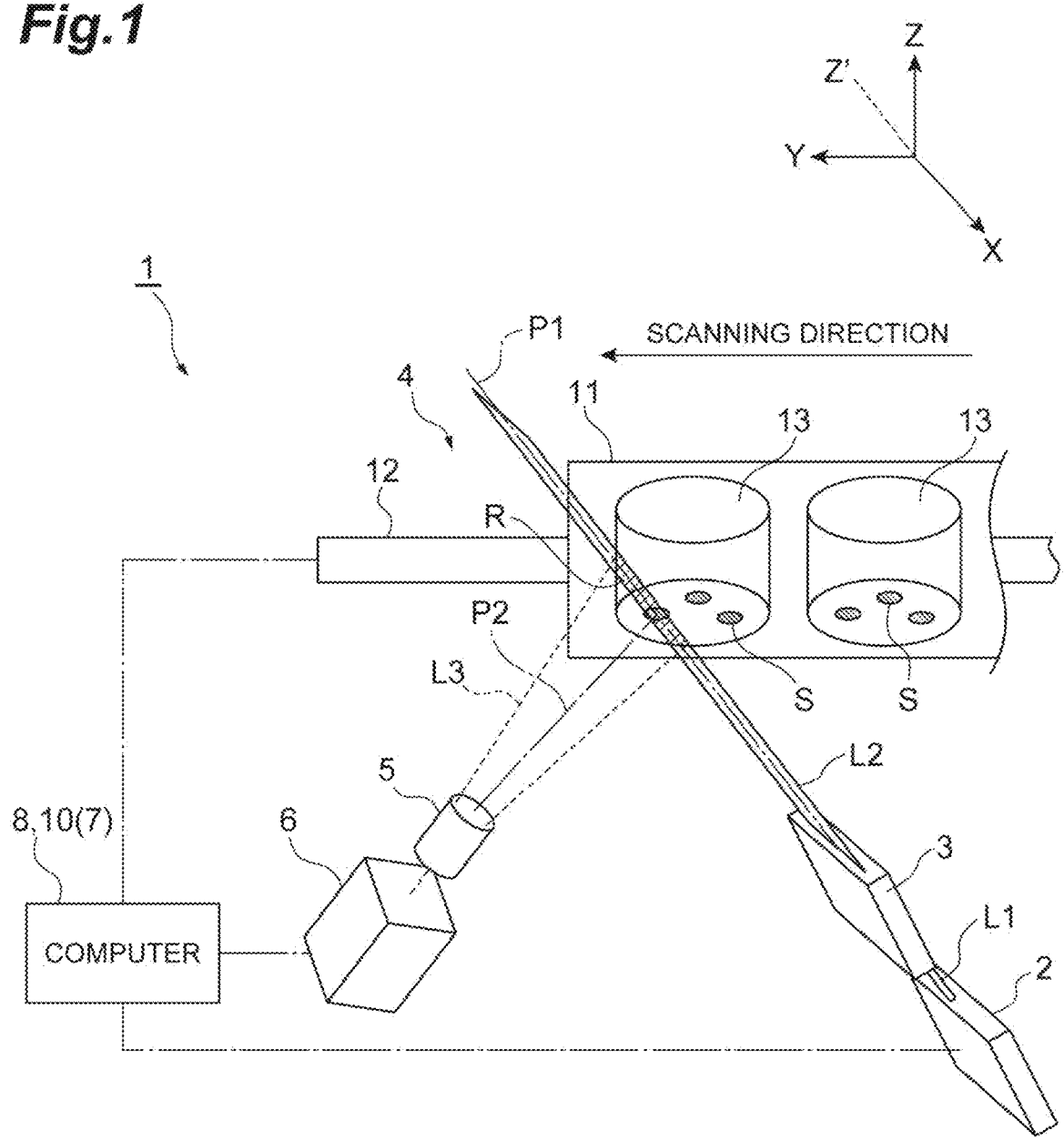
FIG. 1 is a schematic configuration diagram showing an embodiment of a sample observation device.

FIG. 1 is a schematic configuration diagram showing an embodiment of a sample observation device. This sample observation device 1 is a device that emits planar light L2 to a sample S and forms an image of observation light (for example, fluorescence, scattered light, or the like) generated inside the sample S on the image forming surface to acquire observation image data of the inside of the sample S. As this type of sample observation device 1, there are a slide scanner that acquires and displays an image of the sample S held on a slide glass, a plate reader that acquires image data of the sample S held on a microplate and analyzes the image data, and the like. As shown in FIG. 1, the sample observation device 1 is configured to include a light source 2, an emission optical system 3, a scanning unit 4, an imaging optical system 5, an image acquisition unit 6, and a computer 7.

Examples of the sample S as an observation target include human or animal cells, tissues, organs, animals or plants themselves, and plant cells and tissues. The sample S may be contained in a solution, a gel, or a substance having a refractive index different from that of the sample S.

The light source 2 is a light source that outputs light L1 to be emitted to the sample S. Examples of the light source 2 include a laser light source, such as a laser diode and a solid-state laser light source. In addition, the light source 2 may be a light emitting diode, a super luminescent diode, or a lamp light source. The light L1 output from the light source 2 is guided to the emission optical system 3.

The emission optical system 3 is an optical system that shapes the light L1 output from the light source 2 into the planar light L2 and emits the shaped planar light L2 to the sample S along an optical axis P1. In the present embodiment, the optical axis P1 of the emission optical system 3 matches the optical axis of the planar light L2. The emission optical system 3 is configured to include a light shaping element, such as a cylindrical lens, an axicon lens, or a spatial light modulator, and is optically coupled to the light source 2. The emission optical system 3 may be configured to include an objective lens. The planar light L2 formed by the emission optical system 3 is emitted to the sample S. In order to reduce the aberration, the emission optical system 3 may include an optical element, such as a prism. In the sample S to which the planar light L2 is emitted, observation light L3 is generated on the emission surface R of the planar light L2. The observation light L3 is, for example, fluorescence excited by the planar light L2, scattered light of the planar light L2, or diffused reflection light of the planar light L2.

In the case of performing observation in the thickness direction of the sample S, it is preferable that the planar light L2 is thin planar light having a thickness of 2 mm or less in consideration of resolution. In addition, when the thickness of the sample S is very small, that is, when observing the sample S having a thickness equal to or less than the Z-direction resolution described later, the thickness of the planar light L2 does not affect the resolution. In this case, therefore, the planar light L2 having a thickness of more than 2 mm may be used.

Figure 2:
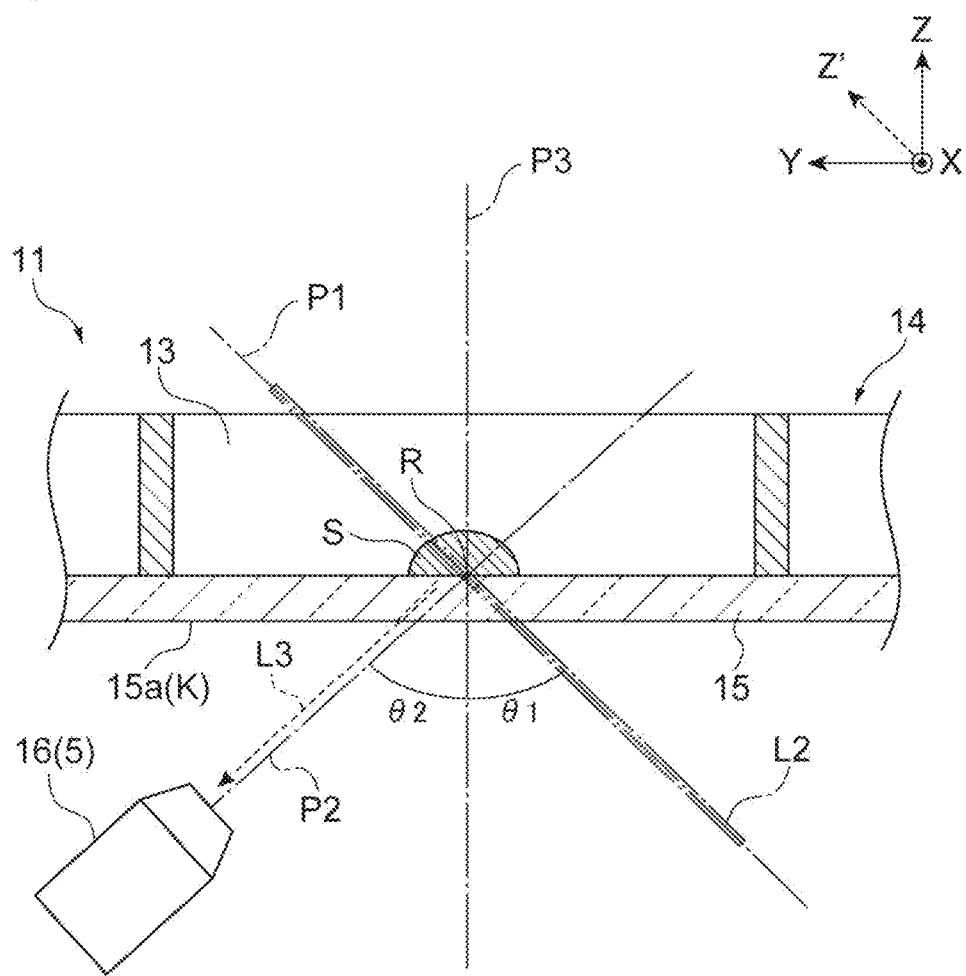
FIG. 2 is an enlarged view of a main part showing the vicinity of a sample.

The scanning unit 4 is a mechanism for scanning the sample S with respect to the emission surface R of the planar light L2. In the present embodiment, the scanning unit 4 is configured by a moving stage 12 that moves a sample container 11 holding the sample S. The sample container 11 is, for example, a microplate, a slide glass, a petri dish, or the like and is transparent to the planar light L2 and the observation light L3. In the present embodiment, a microplate is exemplified. As shown in FIG. 2, the sample container 11 includes a plate-shaped main body 14 in which a plurality of wells 13, in which the sample S is arranged, are arranged in a straight line (or a matrix) and a plate-shaped transparent member 15 provided so as to close one end side of each of the wells 13 on one surface side of the main body 14.

In arranging the sample S inside the well 13, the well 13 may be filled with a medium, such as water. The transparent member 15 has an input surface of the planar light L2 with respect to the sample S arranged in the well 13 and a bottom surface 15a as an output surface of the observation light L3 generated in the sample S by emission of the planar light L2. The bottom surface 15a forms a scanning surface K when the sample S is scanned by the scanning unit 4. In the present embodiment, the optical axis P1 of the emission optical system 3 is inclined at an angle θ1 with respect to a normal P3 of the scanning surface K. The material of the transparent member 15 is not particularly limited as long as this is a member transparent to the planar light L2, and is, for example, glass, quartz, or synthetic resin. In addition, the other end of the well 13 is open to the outside. The sample container 11 may be fixed to the moving stage 12.

As shown in FIG. 1, the moving stage 12 scans the sample container 11 in a preset direction according to a control signal from the computer 7. The moving stage 12 scans the sample container 11 in one direction within a plane crossing the optical axis P1 of the emission optical system 3. In the following description, the scanning direction of the sample S by the moving stage 12 is referred to as a Y axis, the width direction of the sample S on the transparent member 15 is referred to as an X axis, and the depth direction of the sample S on the transparent member 15 is referred to as a Z axis. In addition, a direction along the optical axis P1 of the emission optical system 3 is referred to as a Z' axis. The X axis is an axis perpendicular to the Y axis within a plane perpendicular to the optical axis P1 of the emission optical system 3. The Z axis is an axis that matches the normal P3 direction of the scanning surface K. The emission surface R of the planar light L2 with respect to the sample S is a surface within the XZ' plane.

The imaging optical system 5 is an optical system that forms an image of the observation light L3 generated in the sample S by the emission of the planar light L2. As shown in FIG. 2, the imaging optical system 5 is configured to include, for example, an objective lens 16 and an imaging lens. The optical axis P2 of the imaging optical system 5 is the observation axis of the observation light L3. In the present embodiment, the optical axis P2 of the imaging optical system 5 is inclined at an angle θ2 with respect to the normal P3 of the scanning surface K.

As shown in FIG. 1, the image acquisition unit 6 acquires a plurality of pieces of image data corresponding to the optical image of the observation light L3 formed by the imaging optical system 5. The image acquisition unit 6 is configured to include, for example, an imaging apparatus that captures an optical image of the observation light L3. Examples of the imaging apparatus include area image sensors such as a CMOS image sensor and a CCD image sensor. These area image sensors are arranged on the image forming surface of the imaging optical system 5, captures an optical image by, for example, a global shutter or a rolling shutter, and outputs data of the two-dimensional image to the computer 7.

The computer 7 is physically configured to include a memory such as a RAM and a ROM, a processor (arithmetic circuit) such as a CPU, a communication interface, a storage unit such as a hard disk, and a display unit such as a display. Examples of the computer 7 include a personal computer, a cloud server, and a smart device (a smartphone, a tablet terminal, and the like). The computer 7 functions as a controller that controls the operations of the light source 2 and the moving stage 12, an image generation unit 8 that generates observation image data of the sample S, and an analysis unit 10 that analyzes observation image data, by executing a program stored in the memory using the CPU of the computer system.

The computer 7 as a controller receives an input of a measurement start operation by the user, and drives the light source 2, the moving stage 12, and the image acquisition unit 6 in synchronization with each other. In this case, the computer 7 may control the light source 2 so that the light source 2 continuously outputs the light L1 while the sample S is being moved by the moving stage 12, or ON/OFF of the output of the light L1 from the light source 2 may be controlled in accordance with the image capturing by the image acquisition unit 6. In addition, when the emission optical system 3 includes an optical shutter (not shown), the computer 7 may turn ON/OFF the emission of the planar light L2 to the sample S by controlling the optical shutter.

In addition, the computer 7 as the image generation unit 8 generates observation image data of the sample S based on a plurality of pieces of image data generated by the image acquisition unit 6. For example, the image generation unit 8 configures three-dimensional data of the sample S based on the plurality of pieces of image data output from the image acquisition unit 6, and generates observation image data. The image generation unit 8 stores the generated observation image data and displays the generated observation image data on a monitor or the like according to a predetermined operation by the user.

Figure 3:
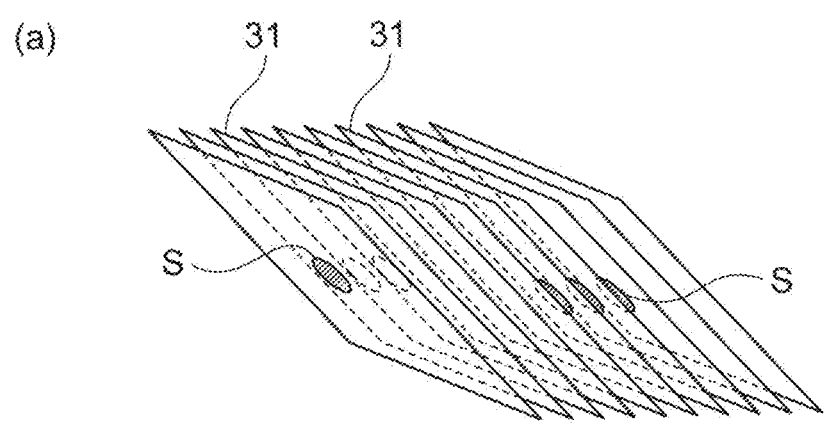
FIG. 3 is a diagram showing an example of generating observation image data by an image generation unit.
Figure 3:
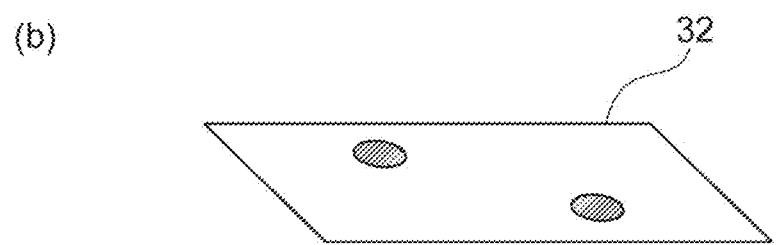

As shown in FIGS. 1 and 2, the emission surface R of planar light with respect to the sample S is a surface within the XZ' plane, and the emission surface R is scanned in the Y-axis direction with respect to the sample S. Therefore, as shown in FIG. 3(a), three-dimensional information of the sample S is accumulated in the image generation unit 8 by acquiring a plurality of pieces of image data 31 corresponding to the XZ' cross section of the sample S in the Y-axis direction. In the image generation unit 8, data is reconstructed using these pieces of image data 31. For example, as shown in FIG. 3(b), an XY cross-sectional image having an arbitrary thickness at an arbitrary position in the Z-axis direction in the sample S is generated as observation image data 32 in which the background is suppressed. In addition, the image generation unit 8 may generate XYZ three-dimensional image data as the observation image data 32 when reconstructing the data using the image data 31.

The computer 7 as the analysis unit 10 performs an analysis based on the observation image data 32 generated by the image generation unit 8 and generates an analysis result. The analysis unit 10 stores the generated analysis result and displays the generated analysis result on the monitor or the like according to a predetermined operation by the user. The observation image data generated by the image generation unit 8 may not be displayed on the monitor or the like, and only the analysis result generated by the analysis unit 10 may be displayed on the monitor or the like. In addition, the observation image data 32 generated by the image generation unit 8 may not be displayed on the monitor or the like, and only the analysis result generated by the analysis unit 10 may be displayed on the monitor or the like.

Figure 4:
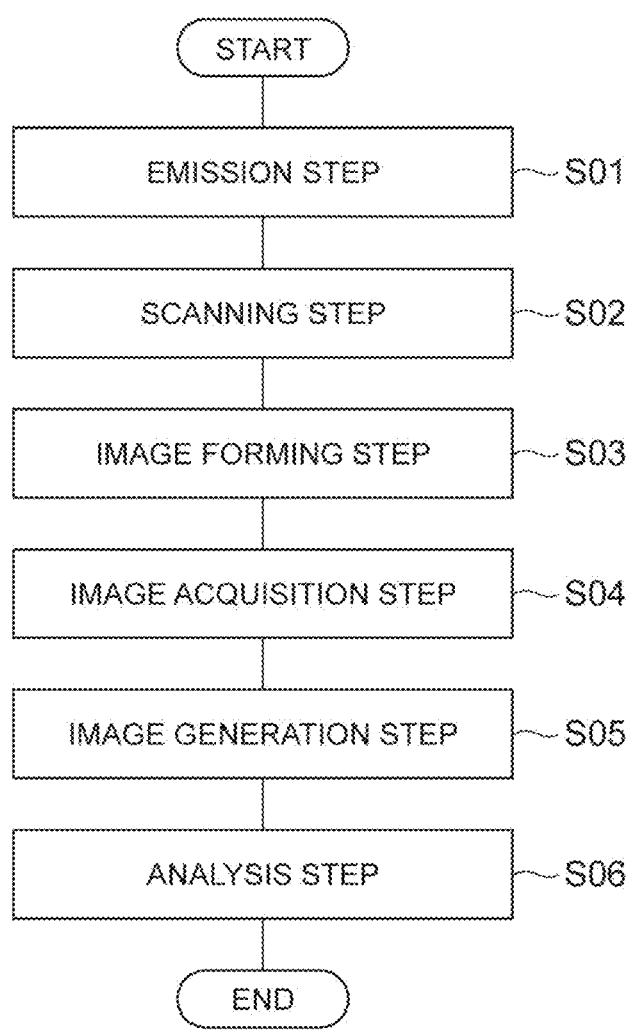
FIG. 4 is a flowchart showing an example of a sample observation method using the sample observation device.

FIG. 4 is a flowchart showing an example of a sample observing method using the sample observation device 1. As shown in the diagram, the sample observation method includes an emission step (step S01), a scanning step (step S02), an image forming step (step S03), an image acquisition step (step S04), and an image generation step (step S05), and an analysis step (step S06).

In the emission step S01, the planar light L2 is emitted to the sample S. When the user inputs a measurement start operation, the light source 2 is driven based on a control signal from the computer 7, and the light L1 is output from the light source 2. The light L1 output from the light source 2 is shaped by the emission optical system 3 to become the planar light L2, which is emitted to the sample S.

In the scanning step S02, the sample S is scanned with respect to the emission surface R of the planar light L2. When the user inputs a measurement start operation, the moving stage 12 is driven in synchronization with the driving of the light source 2 based on a control signal from the computer 7. Accordingly, the sample container 11 is linearly driven at a predetermined speed in the Y-axis direction, and the sample S in the well 13 is scanned with respect to the emission surface R of the planar light L2.

In the image forming step S03, using the imaging optical system 5 having the observation axis P2 inclined with respect to the emission surface R, an image of the observation light L3 generated in the sample S by the emission of the planar light L2 is formed on the image forming surface of the image acquisition unit 6. In the image acquisition step S04, a plurality of pieces of image data corresponding to the optical image of the observation light L3 formed by the imaging optical system 5 are acquired. The image data is sequentially output from the image acquisition unit 6 to the image generation unit 8.

In the image generation step S05, observation image data of the sample S is generated based on the plurality of pieces of image data. In the present embodiment, as shown in FIGS. 1 and 2, the optical axis of the emission optical system 3 is inclined by an angle $\theta 1$ with respect to the normal of the scanning surface K, and the emission surface R is scanned in the Y-axis direction with respect to the sample S. Therefore, as shown in FIG. 3(a), three-dimensional information of the sample S is accumulated in the image generation unit 8 by acquiring a plurality of pieces of image data 31 in the Y-axis direction. In the image generation unit 8, data is reconstructed using the plurality of pieces of image data 31. For example, as shown in FIG. 3(b), XY image data or XYZ three-dimensional image data having an arbitrary thickness at an arbitrary position in the Z-axis direction in the sample S is generated as the observation image data 32 of the sample S.

In the analysis step S06, the analysis unit 10 analyzes the observation image data 32 and generates an analysis result. For example, in drug discovery screening, the sample S and a reagent are put in the sample container 11, and the observation image data 32 is acquired. Then, the analysis unit 10 evaluates the reagent based on the observation image data 32, and generates evaluation data as an analysis result.

Next, the configuration of the optical system of the sample observation device 1 and the generation of the observation image data 32 described above will be described in more detail.

Figure 5:
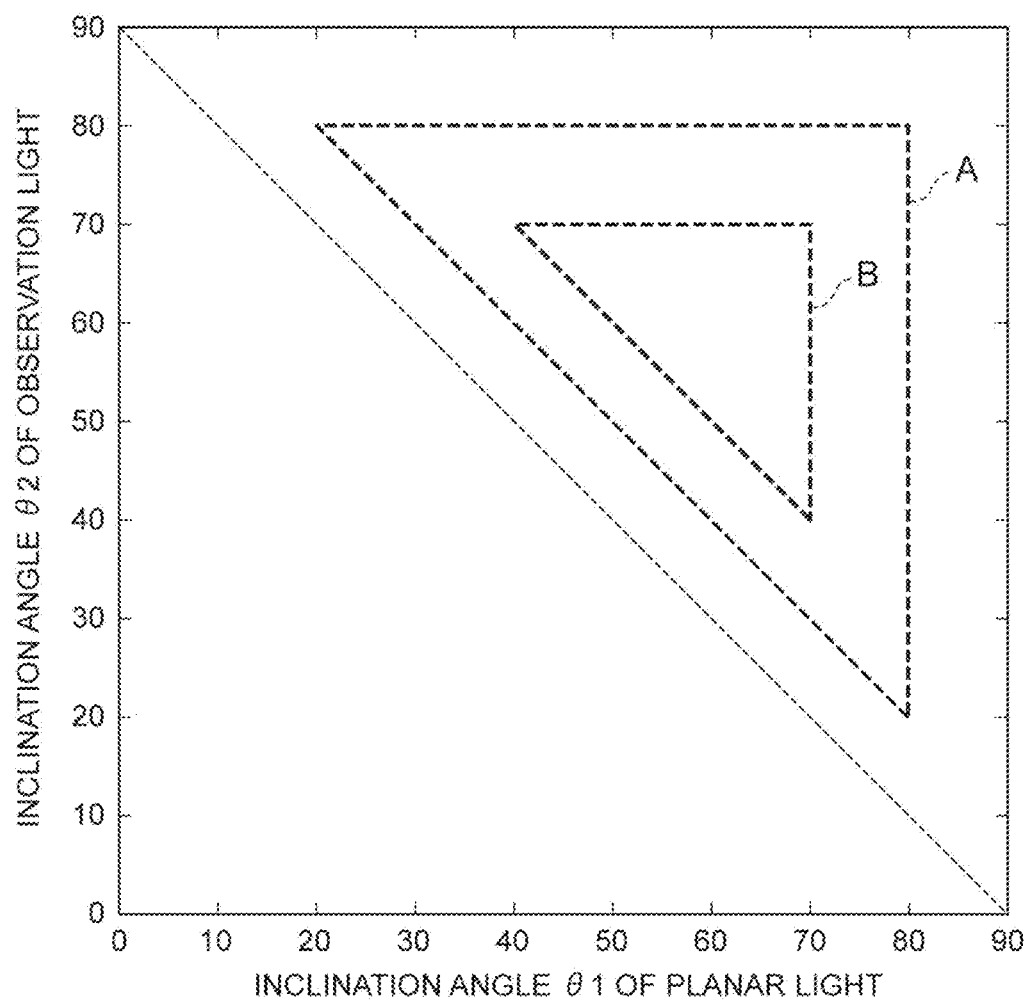
FIG. 5 is a diagram showing a range of an inclination angle of planar light and a range of an inclination angle of observation light with respect to a scanning surface.

In the sample observation device 1, as shown in FIG. 2, the optical axis P1 of the emission optical system 3 is inclined at the angle $\theta 1$ with respect to the normal P3 of the scanning surface K, and the optical axis P2 of the imaging optical system 5 is inclined at the angle $\theta 2$. In the sample observation device 1, 1) both $\theta 1$ and $\theta 2$ are 80° or less, and the sum of $\theta 1$ and $\theta 2$ is 100° or more. In addition, 2) both $\theta 1$ and $\theta 2$ may be 70° or less, and the sum of $\theta 1$ and $\theta 2$ may be 110° or more. A range satisfying 1) and 2) is shown in FIG. 5. In the diagram, a range satisfying 1) is shown as a region A, and a range satisfying 2) is shown as a region B.

Figure 6:
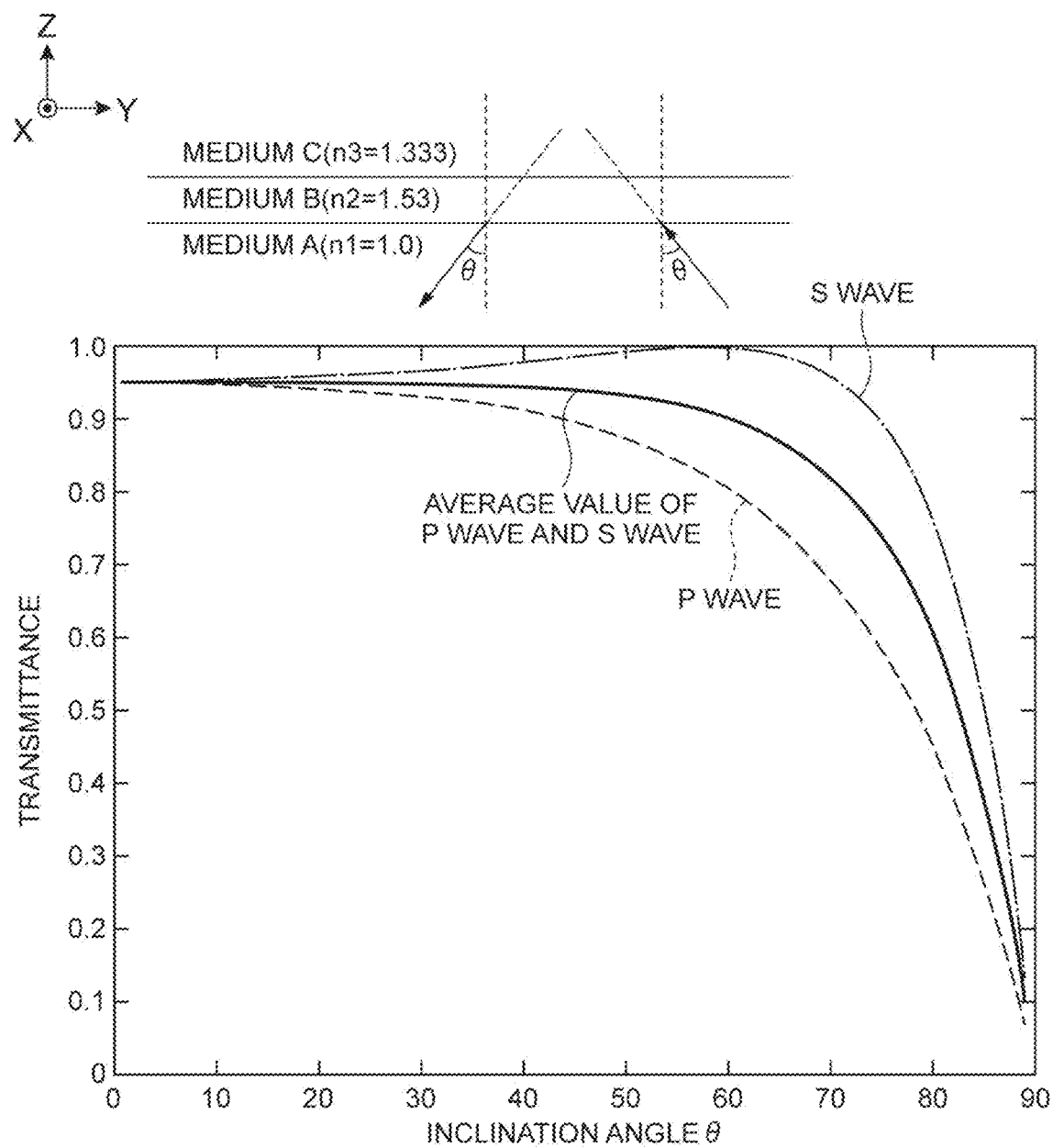
FIG. 6 is a diagram showing the relationship between the inclination angle and the transmittance.

The upper limits of $\theta 1$ and $\theta 2$ are determined based on, for example, the transmittances of the planar light L2 and the observation light L3 with respect to the transparent member 15 of the sample container 11. FIG. 6 is a diagram showing a relationship between the inclination angle and the transmittance. In the diagram, the horizontal axis indicates the inclination angle $\theta$, and the vertical axis indicates the transmittance. In FIG. 6, in consideration of the specific holding state of the sample S in the sample container 11, the refractive index n1 of a medium A is 1 (air), the refractive index n2 of a medium B is 1.53 (glass), and the refractive index n3 of a medium C is 1.33 (water). In addition, the transmittance values of the planar light L2 and the observation light L3 with respect to the transparent member 15 of the sample container 11 are calculated by the product of the transmittance of the interface between the mediums B and C and the transmittance of the interface between the mediums A and B. In FIG. 6, the P wave transmittance, the S wave transmittance, and the angle dependence of their average value are plotted.

From the result shown in FIG. 6, it can be seen that the transmittances of the planar light L2 and the observation light L3 in the sample container 11 can be changed by changing the inclination angle $\theta$. It can be seen that the transmittance of at least 50% or more is obtained when the inclination angle $\theta$ is in the range of 80° or less. In addition, it can be seen that the transmittance of at least 60% or more is obtained when the inclination angle $\theta$ is in the range of 70° or less. Therefore, it is suitable to set the upper limits of $\theta 1$ and $\theta 2$ to 80° or less, preferably 70° or less.

Figure 7:
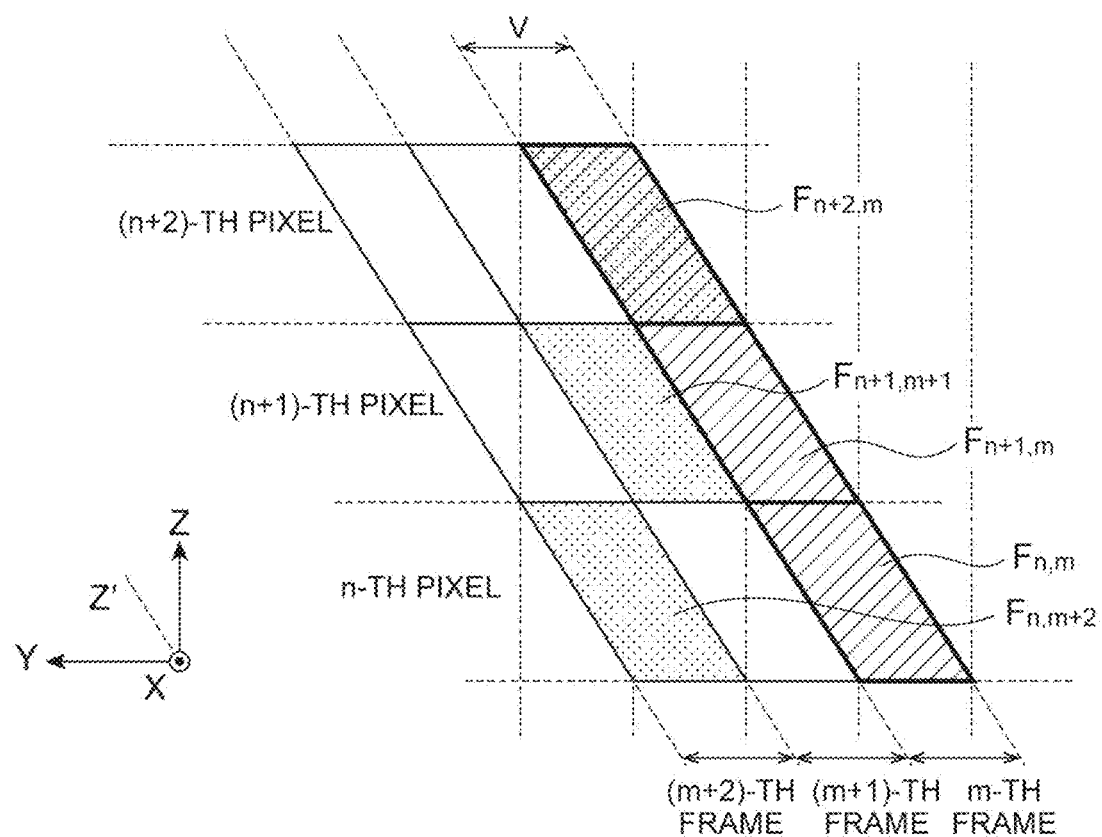
FIG. 7 is a schematic diagram showing how an image is acquired by an image acquisition unit.

In addition, FIG. 7 is a schematic diagram showing how an image is acquired by the image acquisition unit 6. An example in the diagram shows that three pixels of an n-th pixel, an (n+1)-th pixel, and an (n+2)-th pixel in the image acquisition unit 6 perform imaging over three periods of an m-th frame, an (m+1)-th frame, and an (m+2)-th frame. The respective pixels sequentially capture an optical image of a part of the XZ' cross section of the sample S, which is scanned in the Y-axis direction by the scanning unit 4, in the respective frames.

In the image acquisition unit 6, as shown in a hatched portion in FIG. 7, in the m-th frame, an image acquisition region $F_{n+1, m}$ of the (n+1)-th pixel is shifted from an image acquisition region $F_{n, m}$ of the n-th pixel in the scanning direction (Y-axis direction) of the sample S according to the scanning amount V of the sample S in the exposure time of one frame. Similarly, in the m-th frame, an image acquisition region $F_{n+2, m}$ of the (n+2)-th pixel is shifted from the image acquisition region $F_{n+1, m}$ of the (n+1)-th pixel in the scanning direction (Y-axis direction) of the sample S according to the scanning amount V of the sample S in the exposure time of one frame. In order to satisfy such a relationship, the scanning amount V of the sample S in the exposure time of one frame may be set according to the angle $\theta 1$ formed by the optical axis P1 of the emission optical system 3 and the normal P3 of the scanning surface K and the angle $\theta 2$ formed by the optical axis P2 of the imaging optical system 5 and the normal P3 of the scanning surface K. In addition, at least one of the angle $\theta 1$ and the angle $\theta 2$ may be set according to the scanning amount V of the sample S in the exposure time of one frame.

Figure 8:
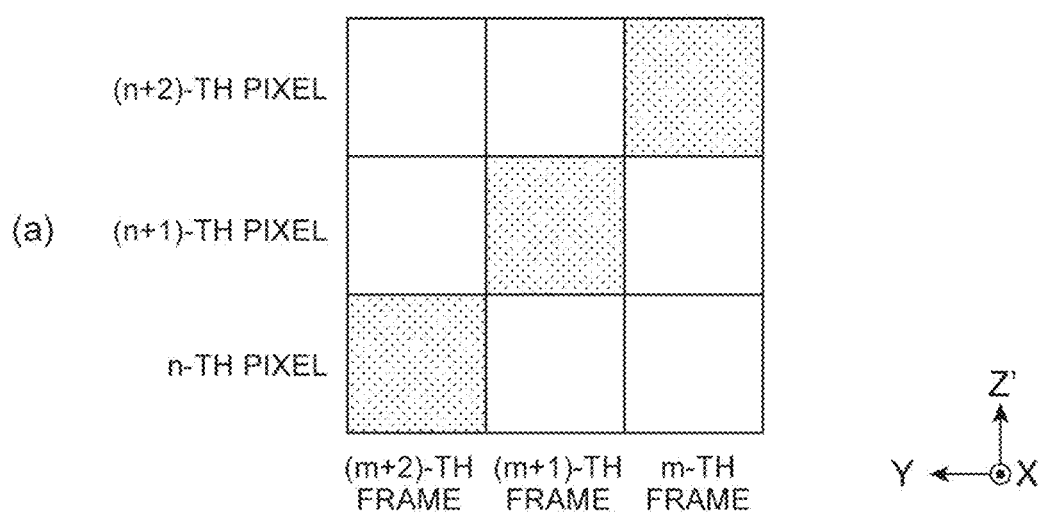
FIG. 8 is a schematic diagram showing how the position of image data is corrected.
Figure 8:
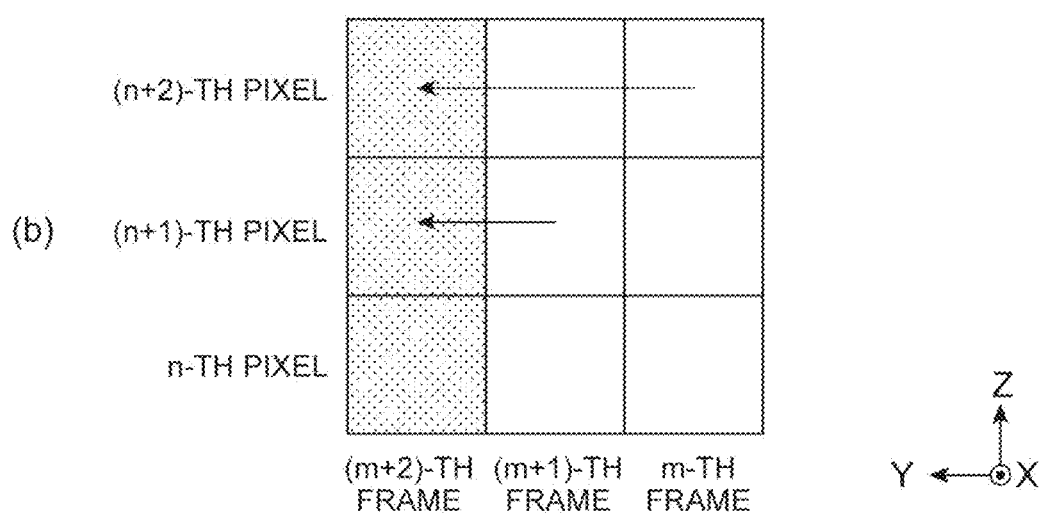

When the above-described relationship is satisfied, as shown in a dot portion in FIG. 7, an image acquisition region $F_{n, m+2}$ at the (n+2)-th pixel of the m-th frame, an image acquisition region $F_{n+1, m+1}$ at the (n+1)-th pixel of the (m+1)-th frame, and an image acquisition region $F_{n, m+2}$ at the n-th pixel of the (m+2)-th frame are adjacent to each other in the Z-axis direction. For this reason, when the observation image data 32 is generated without reconstructing data in the image generation unit 8, as shown in FIG. 8(a), each piece of image data 31 becomes XYZ' image data in the real space, so that image data that is difficult to observe is generated. Therefore, when reconstructing the data by using the image data 31 of each pixel in the image generation unit 8, as shown in FIG. 8(b), the image generation unit 8 corrects the image data 31 separated by n pixels in the Z-axis direction as the image data 31 also separated by n pixels in the Y-axis direction. As a result, each piece of image data 31 becomes XYZ image data in the real space, so that each piece of image data 31 can be easily converted into three-dimensional data in the real space.

Figure 9:
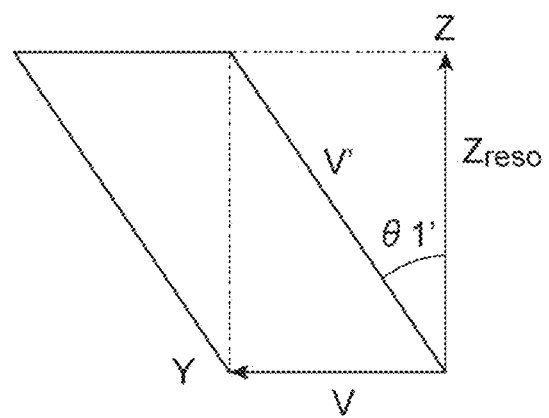
FIG. 9 is a diagram showing a relationship between an image acquisition region of one pixel and the field of view.

FIG. 9 is a diagram showing a relationship between an image acquisition region of one pixel and the field of view. As shown in FIG. 9, the resolution $Z_{reso}$ in the Z-axis direction in one pixel is expressed by the following Equation (1). The relationship of Equation (2) is satisfied between V' in Equation (1) and the scanning amount V.

[Equation 1]

$$Z_{reso} = V' \times \cos \theta_1' \quad (1)$$

[Equation 2]

$$V = V' \times \sin \theta_1' \quad (2)$$

Figure 10:
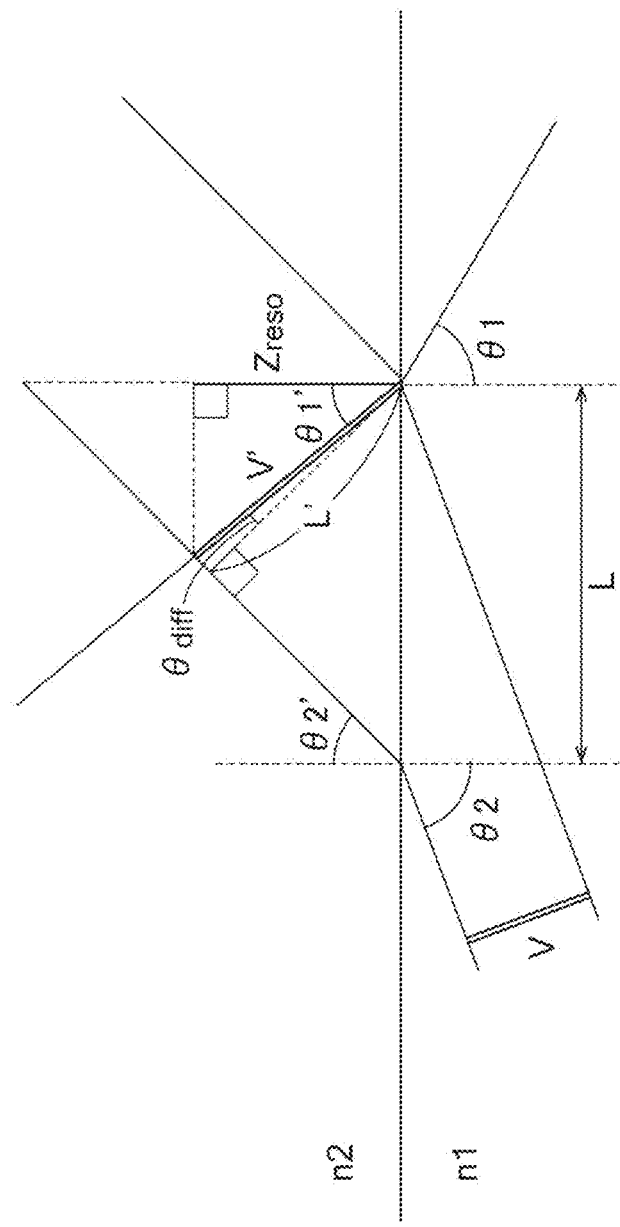
FIG. 10 is a diagram showing a relationship between the inclination angles of planar light and observation light and the field of view.

In addition, FIG. 10 is a diagram showing a relationship between the inclination angles of planar light and observation light and the field of view. In the example shown in the diagram, it is assumed that the imaging optical system 5 is located in the medium A having a refractive index n1 and the emission surface R of the planar light L2 is located in the medium B having a refractive index n2. Here, the field of view V of the imaging optical system 5 is made to match the scanning amount V of the sample S in the exposure time of one frame described above. The field of view V of the imaging optical system 5 is determined by the pixel size and the imaging magnification. By adjusting the exposure time of one frame and the scanning speed of the sample container 11 by the scanning unit 4 so as to match this, the field of view V can be made to match the scanning amount V of the sample S in the exposure time of one frame. Assuming that the distance of the field of view V at the interface between the medium A and the medium B is L, the relationships of the following Equations (3) to (8) are satisfied.

[Equation 3]

$$L = V/\cos \theta_2 \quad (3)$$

[Equation 4]

$$L' = L \times \cos \theta_2' \quad (4)$$

[Equation 5]

$$\sin \theta_1' = (n1/n2) \times \sin \theta_1 \quad (5)$$

[Equation 6]

$$\sin \theta_2' = (n1/n2) \times \sin \theta_2 \quad (6)$$

[Equation 7]

$$\theta_{diff} = |90 - (\theta_1' + \theta_2')| \quad (7)$$

[Equation 8]

$$V' = L'/\cos \theta_{diff} \quad (8)$$

When selecting the combination of θ1 and θ2 from the range of θ1 and θ2 shown in FIG. 2, for example, the following three conditions are considered.

1) As the value of $\theta_{diff}$ decreases, the influence of defocus decreases.

2) As the value of $Z_{reso}$ decreases, the resolution in the Z-axis direction in observation image data improves.

3) When the component of V' in the Y-axis direction matches V, image acquisition regions of pixels adjacent to each other in the Z-axis direction are also adjacent to each other in the Y-axis direction, so that the positional relationship between the pieces of image data can be easily corrected.

As described above, in the sample observation device 1, the optical axis P2 of the imaging optical system 5 is inclined with respect to the scanning surface K of the sample S. Therefore, since the image acquisition unit 6 can sequentially acquire the image data 31 of the tomographic plane in the optical axis P1 direction of the planar light L2, it is possible to acquire the image data 31 with high throughput. In addition, in the image acquisition unit 6, the image acquisition regions F in the adjacent pixels are shifted from each other according to the scanning amount V of the sample S in the exposure time of one frame. Therefore, since the positional relationship between the pieces of image data 31 can be easily corrected, each piece of image data 31 can be easily converted into three-dimensional data in the real space when constructing the observation image data 32.

In addition, in the sample observation device 1, the optical axis P1 of the emission optical system 3 with respect to the scanning surface K is inclined within the range satisfying the conditions of θ1 and θ2. Therefore, since the influence of defocus is reduced, the resolution of the observation image data 32 in the depth direction can be sufficiently improved. When both θ1 and θ2 are 70° or less and the sum of θ1 and θ2 is 110° or more, the influence of defocus can be reduced more preferably.

In addition, the sample observation device 1 also includes the sample container 11 having, as the scanning surface K, a surface serving as an input surface of the planar light L2 and an output surface of the observation light L3. By using such a sample container 11, it is possible to stably scan a plurality of samples S.

In addition, the sample observation device 1 includes the analysis unit 10 that analyzes the observation image data 32 and generates an analysis result. As a result, the observation image data 32 generated by the image generation unit 8 can be analyzed by the analysis unit 10, so that the analysis throughput can also be improved.

The present disclosure is not limited to the above-described embodiment. For example, in the above-described embodiment, the transparent member 15 is provided in the sample container 11 so as to close one end side of the well 13. However, the sample S may be held in a solid substance, such as gel, instead of the sample container 11. In addition, the sample S may be moved by flowing a fluid, such as water, into the transparent container as in a flow cytometer.

In addition, a plurality of pairs of the imaging optical system 5 and the image acquisition unit 6 may be arranged. In this case, the observation range can be expanded, and observation light components L3 having a plurality of different wavelengths can be observed. In addition, a plurality of image acquisition units 6 may be arranged with respect to the imaging optical system 5, or the image acquisition unit 6 may be arranged with respect to a plurality of imaging optical systems 5. The plurality of image acquisition units 6 may be a combination of different types of photodetectors or imaging apparatuses. The light source 2 may be configured by a plurality of light sources that output light components having different wavelengths. In this case, excitation light components having different wavelengths can be emitted to the sample S.

In addition, in order to reduce astigmatism, a prism may be arranged in the imaging optical system 5. In this case, for example, a prism may be arranged on the rear side of the objective lens 16 (between the objective lens 16 and the image acquisition unit 6). As a measure against defocus, the imaging surface of the imaging apparatus in the image acquisition unit 6 may be inclined with respect to the observation axis P2 of the imaging optical system 5. In addition to this, for example, a dichroic mirror or a prism may be arranged between the imaging optical system 5 and the image acquisition unit 6 for wavelength separation of the observation light L3.

REFERENCE SIGNS LIST

1: sample observation device, 3: emission optical system, 5: imaging optical system, 6: image acquisition unit, 8: image generation unit, 10: analysis unit, 11: sample container, 31: image data, 32: observation image data, F: image acquisition region, K: scanning surface, L2: planar light, L3: observation light, R: emission surface, P1: optical axis of emission optical system, P2: optical axis of imaging optical system, P3: normal of scanning surface, S: sample, V: scanning amount.

The invention claimed is:

1. A device, comprising:
an emission optical system configured to emit planar light to a sample;
a scanner configured to scan the sample in one direction within a scanning surface so as to pass through an emission surface of the planar light;
an imaging optical system configured to form an image of observation light generated in the sample by emission of the planar light;
an image acquisition unit configured to have a plurality of pixels arranged in a two-dimensional manner and to acquire a plurality of pieces of image data corresponding to an optical image of the observation light formed by the imaging optical system; and
an image generation unit configured to generate observation image data of the sample based on the plurality of pieces of image data acquired by the image acquisition unit,
wherein, when an angle formed by an optical axis of the emission optical system and a normal of the scanning surface is $\theta 1$ and an angle formed by an optical axis of the imaging optical system and the normal of the scanning surface is $\theta 2$, both $\theta 1$ and $\theta 2$ are 80° or less and a sum of $\theta 1$ and $\theta 2$ is 100° or more, and
in the image acquisition unit, an image acquisition region of an (n+1)-th pixel is shifted from an image acquisition region of an n-th pixel in a scanning direction of the sample according to a scanning amount of the sample in an exposure time of one frame.

2. The device according to claim 1, wherein both $\theta 1$ and $\theta 2$ are 70° or less, and the sum of $\theta 1$ and $\theta 2$ is 110° or more.

3. The device according to claim 1, further comprising:
a sample container having, as the scanning surface, a surface serving as an input surface of the planar light and an output surface of the observation light.

4. The device according to claim 1, further comprising:
an analyzer configured to analyze the observation image data and to generate an analysis result.

5. A method, comprising:
emitting planar light to a sample using an emission optical system;
scanning the sample in one direction within a scanning surface so as to pass through an emission surface of the planar light;
forming an image of observation light, which is generated in the sample by emission of the planar light, using an imaging optical system;
acquiring a plurality of pieces of image data corresponding to an optical image of the observation light formed in the image forming step using an image sensor having a plurality of pixels arranged in a two-dimensional manner; and
generating observation image data of the sample based on the plurality of pieces of image data,
wherein, when an angle formed by an optical axis of the emission optical system and a normal of the scanning surface is $\theta 1$ and an angle formed by an optical axis of the imaging optical system and the normal of the scanning surface is $\theta 2$, both $\theta 1$ and $\theta 2$ are 80° or less and a sum of $\theta 1$ and $\theta 2$ is 100° or more, and
in the acquisition, an image acquisition region of an (n+1)-th pixel is shifted from an image acquisition region of an n-th pixel in a scanning direction of the sample according to a scanning amount of the sample in an exposure time of one frame.

* * * * *